(12) United States Patent
Taleb et al.

(10) Patent No.: US 8,571,215 B2
(45) Date of Patent: Oct. 29, 2013

(54) COMBINED STORAGE AND TRANSMISSION OF SCALABLE MEDIA

(75) Inventors: Annise Taleb, Kista (SE); Per Frojdh, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1201 days.

(21) Appl. No.: 12/160,142

(22) PCT Filed: Nov. 29, 2006

(86) PCT No.: PCT/SE2006/001366
§ 371 (c)(1),
(2), (4) Date: Dec. 23, 2008

(87) PCT Pub. No.: WO2007/078227
PCT Pub. Date: Jul. 12, 2007

(65) Prior Publication Data
US 2009/0185619 A1    Jul. 23, 2009

Related U.S. Application Data

(60) Provisional application No. 60/743,094, filed on Jan. 5, 2006.

(51) Int. Cl.
*H04N 7/167* (2011.01)
(52) U.S. Cl.
USPC .......... 380/217; 370/236; 709/231; 709/233; 375/240.26; 375/240.24; 375/240.25
(58) Field of Classification Search
USPC ............. 370/236; 709/231, 233; 375/240.06, 375/240.24, 240.26; 380/217
See application file for complete search history.

(56) References Cited

U.S. PATENT DOCUMENTS

| 6,438,141 | B1 * | 8/2002 | Hanko et al. ............ 370/477 |
| 2003/0204555 | A1 | 10/2003 | Jones et al. |
| 2005/0060386 | A1 | 3/2005 | Seo |

FOREIGN PATENT DOCUMENTS

| EP | 0665693 A2 | 8/1995 |
| EP | 0665693 B1 | 3/1996 |
| EP | 1 235 392 A1 | 8/2002 |
| EP | 1 580 938 A1 | 9/2005 |
| JP | H05-111017 A | 4/1993 |
| WO | WO0228108 A2 | 4/2002 |
| WO | WO 03/026233 A1 | 3/2003 |

* cited by examiner

*Primary Examiner* — Eleni Shiferaw
*Assistant Examiner* — Paul Callahan

(57) ABSTRACT

The invention involves collective management of video and audio content in a content provider. The video and audio content is available in multiple potential versions, e.g. in the form of scalable media or media pre-encoded to fixed bandwidth levels. The video and audio data is associated with bandwidth share information enabling estimation of a respective apportionment of a total available bandwidth to the video and audio content. The provider uses this share information and information of the total assignable bandwidth level for providing a respective video version and audio version from the multiple potential versions. This allows for increased user-quality when rendering the video and audio data as optimal video and audio version can be dynamically provided during the media session.

28 Claims, 8 Drawing Sheets

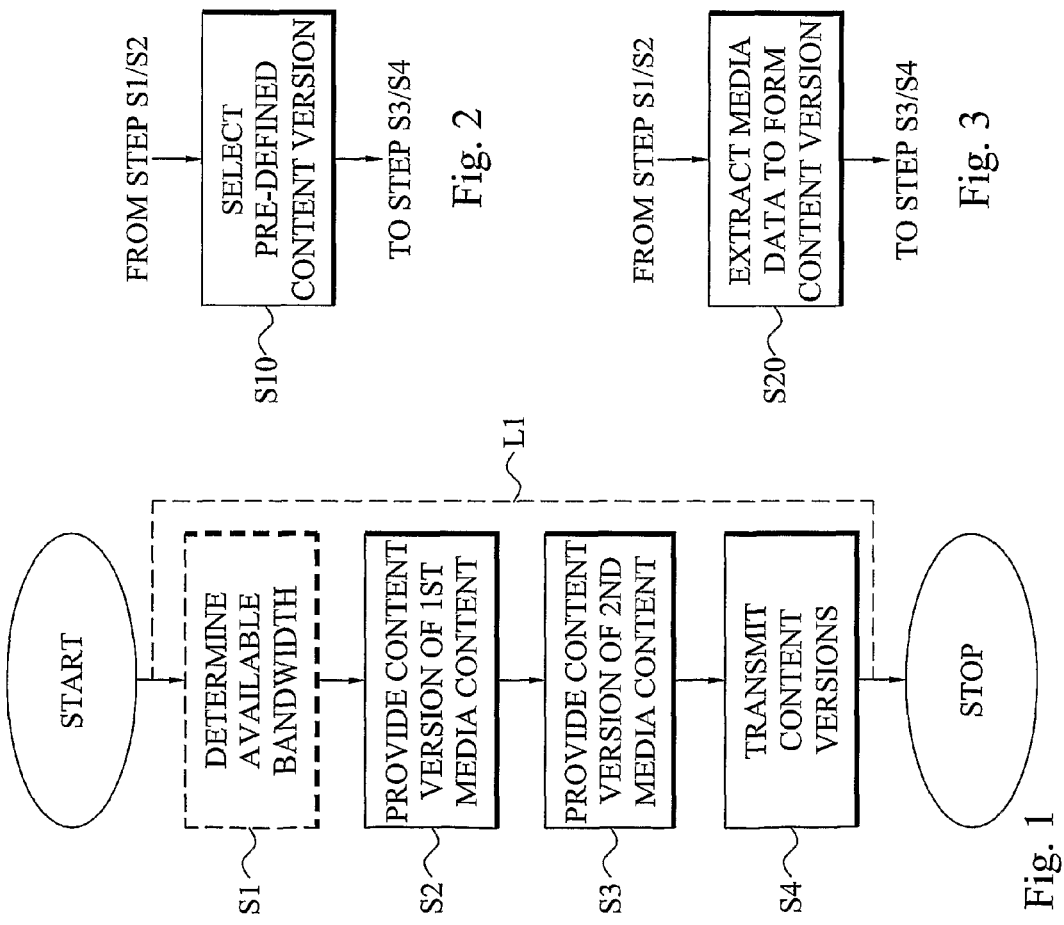

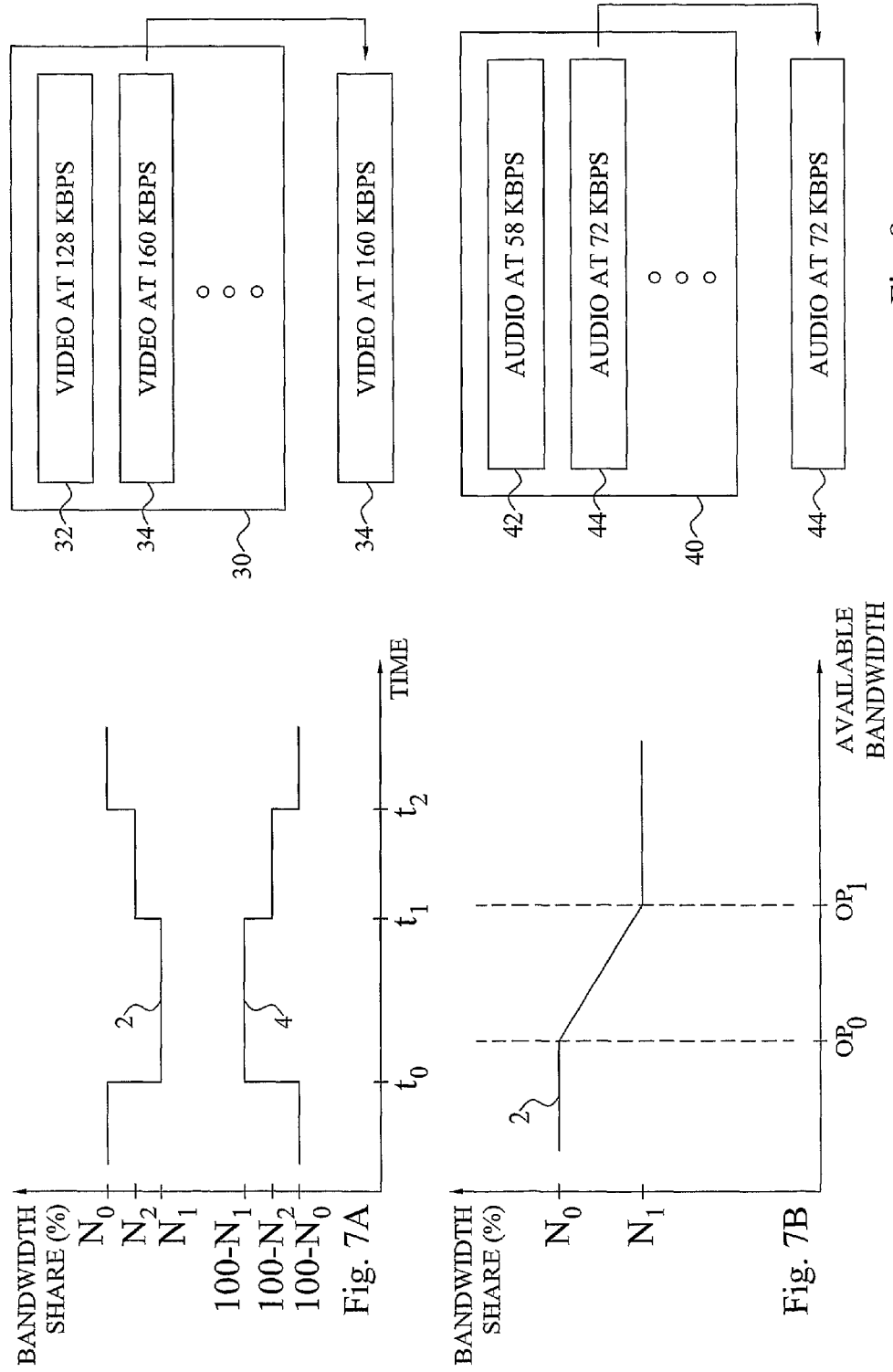

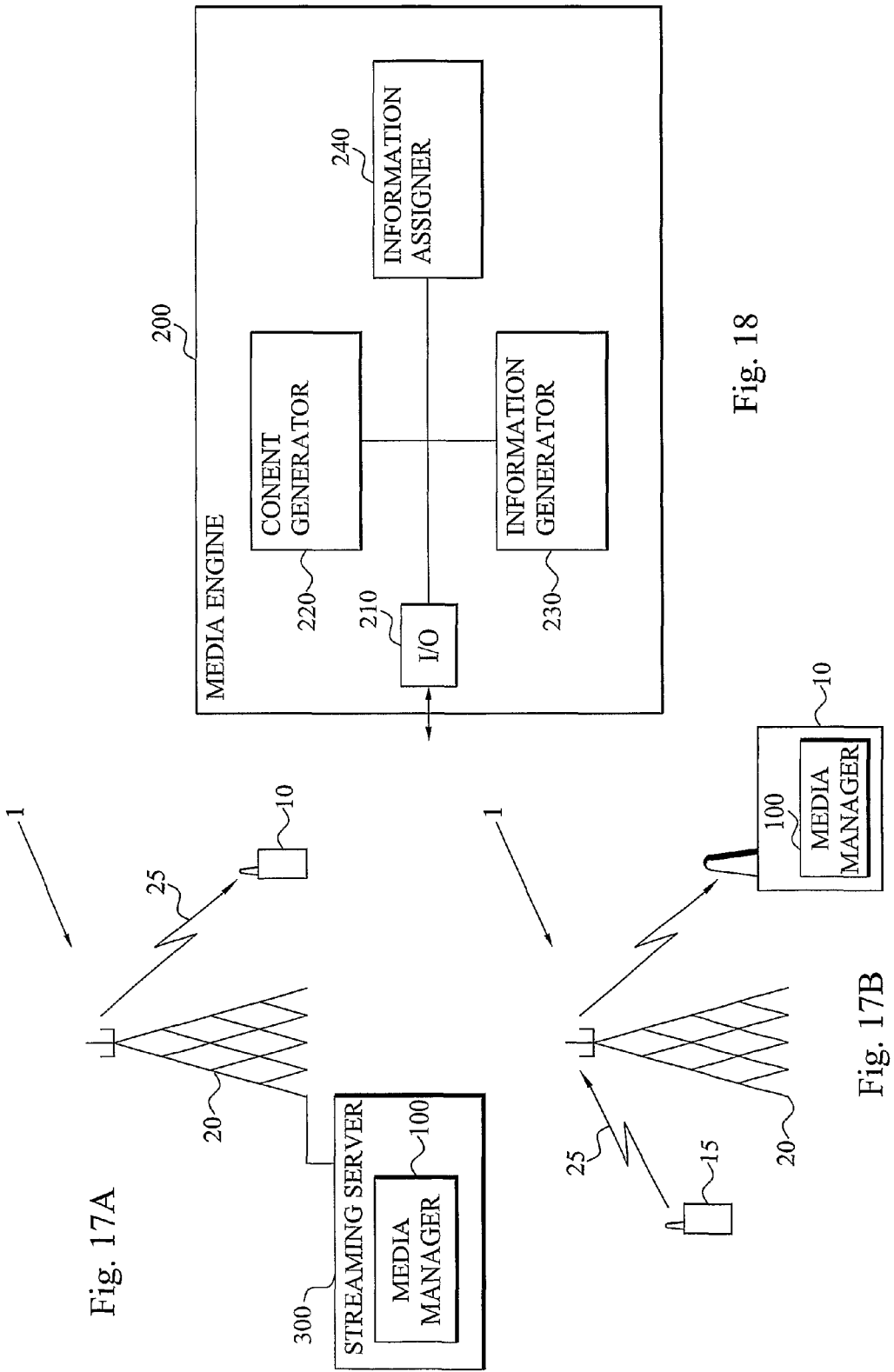

COMBINED STORAGE AND TRANSMISSION OF SCALABLE MEDIA

This application claims the benefit of U.S. Provisional Application No. 60/743,094, filed Jan. 5, 2006, the disclosure of which is fully incorporated herein by reference.

TECHNICAL FIELD

The present invention generally relates to media content management, and in particular to media content creation and dynamic provision of media content during a media session.

BACKGROUND

Media and multimedia provision to client over different networks have increased tremendously the last few years. Today, Internet is employed by numerous users for accessing and downloading media, e.g. in the form of video and audio streams or files, from media server. This media provision has also emerged in radio-based mobile communications networks. There is currently a very big interest in using mobile networks for multimedia or TV content. This is often referred to as Mobile-TV in the art. This media provision in the mobile networks is today mainly available through unicast transport. However, at the moment, broadcast/multicast delivery methods for Mobile-TV are under development. Examples of such standardisation efforts are 3GPP Multimedia Broadcast/Multicast Services (MBMS) and European Telecommunications Standards Institute (ETSI) Digital Video broadcasting-Handheld (DVB-H).

In line with this increasing demand for media provision in different wired and wireless communications networks, scalable media has been developed. Scalable media typically refers to coding schemes where pre-encoded bit streams can be combined, truncated or cropped to form new bit streams that target different goals, for example in terms of media quality, frame rate, screen resolution, number of transmission channels and bit rates. One paradigm is to encode once at high quality and extract multiple times to form reduced bit streams suitable for transmission in various situations. Another paradigm is to encode a first time at a low-quality and then to add additional layers that provide a quality enhancement.

The Joint Video Team (JVT) of the International Telecommunication Union (ITU) Telecommunication Standardization Sector (ITU-T) and International Organization for Standardization/International Bectrotechnical Commission (ISO/IEC) are currently defining Scalable Video Coding (SVC) as an extension to the video codec H4.264|MPEG-4 (Moving Picture Experts Group) Advanced Video Coding (AVC). SVC provides full scalability in three dimensions; temporal, spatial and signal-to-noise ratio (SNR), and is expected to become an international standard shortly. MPEG is also currently exploring scalable audio and speech coding.

However, the current management of scalable media streams in streaming or downloading servers is mainly concerned with the storage of one or more scalable media streams and extraction of data from this stream. No special considerations are made to optimize the bandwidth usage for the simultaneous extraction of data streams.

SUMMARY

There is a problem in the prior art of managing media sessions when multiple potential versions of a media content, such as scalable media, are available at a media server in terms of efficient selection of media content version and bandwidth usage.

The present invention overcomes these and other drawbacks of the prior art arrangements.

It is a general object of the present invention to provide or enable an efficient media management in a media session.

This and other objects are met by the invention as defined by the accompanying patent claims.

Briefly, the present invention involves media management and in particular media creation and management of media in a media session. According to the invention, a media group comprising at least a first media content, such as video, and a second media content, such as associated audio, are available at a media server. The first and second media contents will be collectively managed during the media session and are preferably subsequently collectively rendered at a destined, requesting client. Both the first and second media contents are available in the form of multiple potential versions, where each content version is adapted for a respective bandwidth utilization level. This means that it is possible to provide multiple different content versions from the first and second contents and use them in the media session. For example, media content can be in the form of scalable media, from which media data can be extracted to form a particular media content version. Another example is the usage of multiple pre-encoded content versions that are encoded for usage at particular bandwidth levels or intervals.

The media content group is also associated with so-called bandwidth or rate share information. This information enables estimation of a respective apportionment of a total available bandwidth level to the respective first and second media contents in the session. At session set-up and/or later during the session, the media server provides, based on this bandwidth share information and information of the total bandwidth level available for transmission of data of the media group to a destined client, a version of the first media content and a version of the second media content. Media data of the two provided content versions is then simultaneously transmitted, using the assigned total available bandwidth, to the client.

The bandwidth share information is preferably time-dependent and/or bandwidth-dependent. In such a case, the provision of content versions can be updated over time during the media session and/or to cope with changes in the total available bandwidth.

The present invention enables advantageous selection and provision of content versions in terms of user-quality when rendering the media at a client. As a consequence, a media content having properties well-suited to the current conditions can be selected, preferably dynamically selected, and used through the media session.

The present invention also relates to generation of a media content group comprising at least a first and a second media content, each having multiple potential content versions, and bandwidth share information. A media manager for managing a media session, a network node or user terminal housing such a media manager and a media engine are also within the scope of the present invention.

SHORT DESCRIPTION OF THE DRAWINGS

The invention together with further objects and advantages thereof, may best be understood by making reference to the following description taken together with the accompanying drawings, in which:

FIG. 1 is a flow diagram illustrating a method of managing a media session according to an aspect of the present invention;

FIG. 2 is a flow diagram illustrating an embodiment of the providing steps of FIG. 1 in more detail;

FIG. 3 is a flow diagram illustrating another embodiment of the providing steps of FIG. 1 in more detail;

FIG. 4 is a flow diagram illustrating additional steps of the media session managing method of FIG. 1;

FIG. 5 is a flow diagram illustrating an additional step of the media session managing method of FIG. 1;

FIG. 7A is a diagram schematically illustrating usage of time-dependent bandwidth share information according to the present invention;

FIG. 7B is a diagram schematically illustrating usage of bandwidth-dependent bandwidth share information according to the present invention;

FIG. 8 is a diagram schematically illustrating provision of media content versions according to a first embodiment of the present invention;

FIG. 17A is a schematic overview of a radio-based communications system to which the teachings of the present invention can be applied;

FIG. 17B is a schematic overview of another radio-based communications system to which the teachings of the present invention can be applied; and FIG. 18 is a schematic overview of a media engine according to yet another aspect of the present invention.

DETAILED DESCRIPTION

Figure 14:
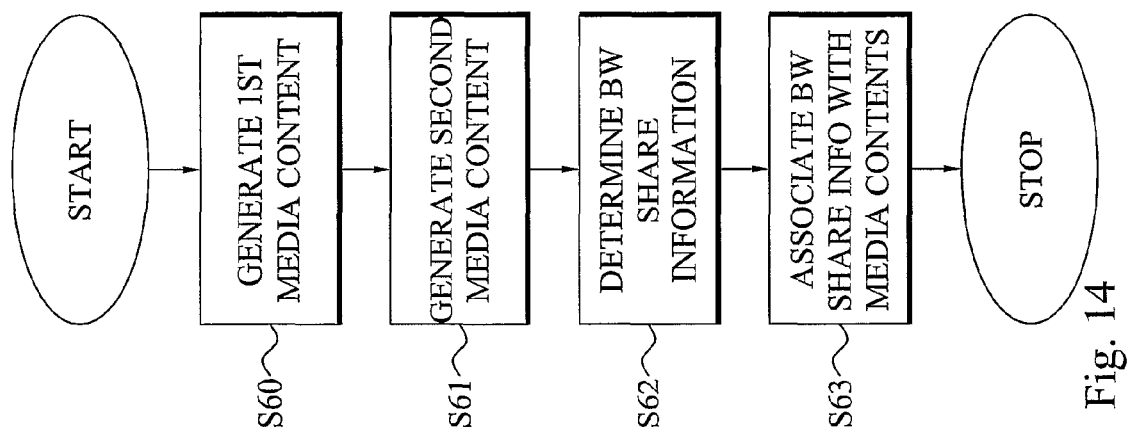
FIG. 14 is a flow diagram illustrating generation of media content according to another aspect of the present invention.

Throughout the drawings, the same reference characters will be used for corresponding or similar elements.

The present invention generally relates, in a first aspect, to media session management, and in particular to efficient selection or provision of media content during such a session. In a preferred embodiment of this aspect, the invention relates to dynamic provision of media content during an ongoing media session. A second aspect of the invention relates to generation of media content that efficiently can be employed during a media session.

According to the current invention, media or multimedia data or content refers to any data that can be provided by a content provider or server to a client for rendering of the data. Typical preferred examples include video data and audio data.

The media data of the invention is available in multiple, i.e. at least two, potential versions. In addition, each of these multiple potential media content versions is adapted for a respective bandwidth level. In a typical implementation, the media data is therefore preferably encoded or otherwise adapted to a particular bandwidth level.

In a first implementation, a media content can be provided in multiple pre-encoded versions, each being encoded to a particular bandwidth level or interval. For example, uncoded media content is encoded to be used at a first bandwidth level. The same media content or a copy thereof is likewise encoded to form a second media content version adapted to be used a second bandwidth level, and so forth. In this manner multiple hard/fixed-encoded versions of a single media content source can be generated and used according to the invention.

In a second implementation, the media content is in the form of scalable media which can be regarded as a source of multiple potential content versions by extracting different portions of the scalable media content to form multiple content versions adapted for different bandwidth levels. As compared to usage of multiple fixed-encoded content versions, scalable media typically allows provision of vastly more content versions. In addition, fixed-encoded content version may, for example, be available adapted to some three to four different bandwidth levels, whereas content versions adapted to a whole range of bandwidth levels can be generated based on scalable media.

Bandwidth is used throughout the present invention for denoting a quantity or resource employable for transmission of media content from a media operator or server, such as streaming or downloading server, or user terminal to a client, where the content is rendered. In a preferred embodiment of the invention, the bandwidth quantity is bit rate. However, other resources and quantities known in the art and descriptive of data transmission rate, quantity or quality can likewise be used and are therefore within the scope of the present invention.

In a media session according to the present invention, media contents of a media content group are collectively managed. This media content group comprises at least a first media content and a second media content. In a typical embodiment of the present invention, one of the first and second media content is video content and the other of the first and second media content is an associated audio content. However, the present invention also anticipates other combinations of media content than audio and video into a media content group. In addition, the media content group can comprise more than two different media contents.

As has been described in the foregoing, each of the first and second media contents of the content group are available in multiple potential versions, where each of the potential versions is adapted, such as encoded, for a respective bandwidth level. In other words, the first media content is available as scalable media and/or multiple fixed-bandwidth pre-encoded content versions and the second media content is likewise available as scalable media and/or multiple fixed-bandwidth encoded versions.

The present invention generates and employs bandwidth share information in connection with a media content group. This bandwidth share information enables estimation of a respective apportionment of the available bandwidth to the first and second media content for usage in transmission of media data on at least one transmission carrier. The share information is further used in deciding what content versions of the first and second media content to use and how to scale the relevant media in order to fulfill the desired overall bandwidth requirements. This bandwidth share information is used by a media server for defining how media content is to be combined when scalable media and/or media versions with different fixed bandwidth capabilities are available. For example, the share information can define the share of available bandwidth that can be used for the different media contents of the media group during transmission of the contents from the media server to an intended client.

The bandwidth share information of the invention can be static, in terms of applying a same pre-defined bandwidth share to a media content group throughout a whole media session irrespective of the current available bandwidth level. However, in a preferred embodiment of the invention, the bandwidth share information is time-dependent and/or depends on the current available bandwidth level. In this preferred embodiment of the invention, the bandwidth share information is employed to dynamically provide media content of the media content group, not only in connection with media session set-up, but also throughout the actual media session. This therefore allows for switching media content version of the first and/or second media content during the actual media session based, for example, on the current bandwidth level and/or the current time position in the media content streams. In this way, the bandwidth share information can be regarded as time/bandwidth-dependent information on target ratios between scalable or alternative media streams that are supposed to share a common bandwidth resource and it enables optimization of the usage of the common bandwidth resource shared by several (scalable or non-scalable) media streams.

FIG. 1 is a flow diagram of a media session method according to the present invention. In this method, a media server or operator, such as in the form of a streaming server, media downloading server or any other unit having access to at least two media contents of a media content group, including a user terminal, provides and transmits media content to a requesting client, such as user terminal. Media data of at least a first media content and a second media content of a media content group are collectively managed, i.e. provided and transmitted, during this media session.

The method starts in the optional step S1, where the current bandwidth level available and assigned for transmission of the media data is determined. This bandwidth level can depend on numerous factors, including capabilities of the receiving client, capabilities of the (radio) transmission carrier, amount of (radio) transmission resources available to the media server, current radio conditions, etc. Different methods and techniques well-known in the art of determining or at least estimating this bandwidth availability can be used in this step S1. Note that the bandwidth determination does not necessarily have to be conducted by the media server or solely by the media server. In clear contrast, other network nodes or terminal present within the communications network can perform or participate in this bandwidth determination.

In a next step S2, a media content version of the first media content is provided based on the determined available bandwidth level and bandwidth rate share information. This means that the media content version of the multiple available potential versions of the first content being most adapted ("optimized") to the current bandwidth share available for the first content, as determined based on the share information and the determined total available bandwidth level, can be provided.

A next step S3, correspondingly, provides a media content version of the second media content in the media group based on the available bandwidth level and the share information. The provided content version of the second content is preferably also the most adapted for the current bandwidth situation.

In a next step S4, the provided versions of the first and second media content are transmitted to the intended client or clients. In a preferred embodiment, the at least two media versions are collectively transmitted using at least one transmission carrier to the client(s). The transmission may be in the form of a wired forwarding of media streams but is preferably conducted through wireless, radio-based data transmission.

As was mentioned in the foregoing, the provision of media content version could be static and apply throughout the whole media session. In such a case, the steps S1 to S3 of FIG. 1 are preferably conducted in connection with or following the session set-up procedure. However, in a preferred implementation the bandwidth share information associated with the media group is dynamic in terms of defining multiple different bandwidth shares for different available bandwidth levels or for different portions of the media content. In these cases, it might be necessary or preferred to update the provision of the media content versions during the media session, which is schematically illustrated by the line L1.

For example, the bandwidth share information might specify that 60% of the available bandwidth level should be allocated to the first media content, with the remaining 40% assigned to the second content, for a bandwidth level over e.g. 200 kbps (kilobit per second). However, if the available bandwidth is less than 200 kbps, 50% of the bandwidth (bit rate) should be assigned to respective media content of the media group. Assuming that the available bit rate at the start of the media session is 230 kbps, the first rate share version (60% vs. 40%) should be used. This means that 0.60×230=138 kbps is available for the first media content, whereas 0.40×230=92 kbps are assignable to the second media content. A content version of the multiple potential first media content versions being adapted for usage at a bit rate of 138 kbps is then provided and correspondingly a content version of the second media content adapted for 92 kbps is provided. These two provided content versions are employed during the beginning of the media session. However, after a while the available bandwidth level might suddenly drop to, for example, 184 kbps. At this bandwidth level, the second rate share version is valid, resulting in that 0.50×184=92 kbps is available per media content version. In this particular example, the same content version that was used in the beginning of the media session for the second media content can still be employed. However, for the first media content, a content version adapted for a bit rate of 92 kbps and not 138 kbps should now be used in the media session.

In this case, the bandwidth share information comprises at least two bandwidth share values, where each such value is associated with a defined bandwidth level set. The set can include a single bandwidth value, such as 200 kbps, an open or closed interval, such as <200 kbps, ≥130 kbps or 100-150 kbps. This means that a bandwidth share value to use is identified based on a comparison of the determined total available bandwidth level and the different defined bandwidth level sets. The media content versions of the first and second media content to use are then provided based on the available bandwidth and the identified bandwidth share value.

FIG. 7B is a diagram schematically illustrating this situation. In the figure, the curve 2 could represent the video bandwidth share value (N %), whereas the corresponding audio bandwidth share value can be calculated therefrom, 100-N %. The bandwidth share information then comprises the two video bandwidth share values, $N_0$ and $N_1$, illustrated in the figure. The first value $N_0$ is to be applied at available bandwidth levels below a defined first operation point ($OP_0$), information of which is preferably included in or associated with the bandwidth share information. Correspondingly, the second value $N_2$ is to be applied at available bandwidth levels exceeding a second defined operation point ($OP_1$). For the interval between the two operation points, the video bandwidth share is specified to be in the range between $N_0$ and $N_1$. A first implementation is to use a linear interpolation as illustrated in the figure. Alternatively, the average of the two video share values $N_0$ and $N_1$ could be used throughout this interval.

A similar updating of media content versions is also possible when employing time-dependent bandwidth share information. For example, the first media data can be video of a news report with the second media data as the associated audio for the news report. The news report can consist of two major parts, a first part of a newscaster reading newsflashes and a second following part of a video sequence of a car accident. In the first part, a higher portion of the bandwidth may be assigned to audio for encoding the speech while a lower portion to video is enough to handle the relatively small movements of the newscaster. However, in the second part of the report relatively more bandwidth should be assigned to the video to cope with the fast moving objects of the car accident video sequence at the cost of bandwidth assignable to the audio part during this car accident sequence. In this case, different video and audio versions adapted for different bit rate levels can therefore be provided during the first and second parts of the news report based on the available bandwidth level and the time-dependent rate share information.

FIG. 7A is a diagram schematically illustrating the concept of having time-dependent bandwidth share. In the figure, the curve 2 represents the time-dependent share value of video (first media content), whereas the curve 4 represents the time-dependent share value for audio (second media content). The respective allocation of available bandwidth to the video and audio is changed, in the figure, at three time instances: $t_0$, $t_1$ and $t_2$. Thus, during a first part of the media session ($t<t_0$) a first set of video ($N_0$) and audio ($100-N_0$) share values are employed. However, during a second following period ($t_0<t<t_1$), the share value ($100-N_1$) of the audio increases at the cost of the video share value ($N_1$). During this period more of the available bandwidth is to be allocated to the audio content as compared to the first period. In a third following period ($t_1<t<t_2$) the video share value ($N_2$) increases slightly and the audio share value ($100-N_2$) correspondingly decreases. For the remaining portion of the media session ($t>t_2$) the same share values ($N_0$, $100-N_0$) as was employed during the first part of the session will be used according to the figure.

The method then ends.

The usage of bandwidth share information of the invention as described above is preferably used by a media server in connection with media data provision during a media session. The share information may, however, also be useful at the actual rendering in a client. Thus, the share information may then be used by the local media player, or some other media manager in the client, when two media contents, such as audio and video, are to be collectively scaled.

FIG. 2 is a flow diagram illustrating an embodiment of the providing step S2 and/or the providing step S3 in FIG. 1 in more detail. The method continues from step S1 or S2 of FIG. 1. In this embodiment, the media content is available in the form of multiple pre-defined content versions. For example, the media content can be in the form of multiple fixed-rate encoded media versions. In such a case, a pre-defined content version to employ is selected based on the available bandwidth level and the bandwidth share information in step S10. The method then continues to step S3 or S4 of FIG. 1.

FIG. 3 is a flow diagram illustrating another embodiment of the providing step S2 and/or the providing step S3 of FIG. 1 in more detail. The method continues from step S1 or S2 of FIG. 1. In this embodiment, the media content is a scalable media content from which multiple content versions can be provided by extracting media data from the scalable media content file or stream. Thus, step S20 extracts media data from the scalable media content based on the available bandwidth level and the bandwidth share information. The data extraction allows provision of a media content version that is adapted for a bandwidth level assignable to the media content and defined based on the available bandwidth level and the share information. The method then continues to step S3 or S4 of FIG. 1.

It is anticipated by the present invention that the first and second media content can be available in multiple different pre-defined (pre-encoded) content versions. In such a case, each of the providing steps S2 and S3 is preferably conducted as described in connection with FIG. 2. Correspondingly, the first and second media content can be in the form of scalable media. In such a case, each of the providing steps S2 and S3 is preferably conducted as described in connection with FIG. 3. However, it is also possible that at least one of the first and second media content is available as both scalable media content and in the form of multiple pre-defined content versions. In such a case, the providing steps S2 or S3 (depending on whether the first or second media being available in both scalable and pre-defined forms) can be conducted as described in connection with FIG. 2 or 3, depending on whether the media server selects to employ the scalable media form or the pre-defined media forms, which is discussed further herein.

FIG. 4 is a flow diagram illustrating additional steps of the media session method of FIG. 1. The method continues from step S1 of FIG. 1. In a next step S30, a bandwidth level assignable to the first media content is determined based on the total available bandwidth level and the bandwidth share information. Correspondingly, a bandwidth level assignable to the second media content is determined based on the total available bandwidth level and the share information in step S31.

In a typical case, the share information comprises a target percentage of the (total) available bandwidth level that is to be allocated to the first media content, the second media content or both first and second media content for transmission using said at least one transmission carrier. In the former cases, the share information can specify that N % of the bandwidth is assignable to the first or second media content. The media content that does not have any defined target percentage will be assigned the surplus bandwidth so that the allocation of the bandwidth adds up to 100%. This means that 100-N % is allocated to the other media content in the case of only two media contents per media group. If M is used to denote the total available bandwidth level for the media session, the bandwidth available for the first media content would then be $$\frac{N}{100} \times M\ kbps$$

and for the second media content $$\frac{100-N}{100} \times M\ kbps.$$

Instead of specifying a target percentage for one or all media contents of the media group the share information can include a bandwidth quotient or some other quantity that enables estimation of the respective apportionment of the available bandwidth level to the different media contents of the media content group.

In either case, the method continues to step S2 of FIG. 1 where a media content version of the first media content is provided based on the determined bandwidth level assignable to this first content. A content version of the second media content is correspondingly provided based on the determined bandwidth level assignable to the second content.

FIG. 5 is a flow diagram illustrating an additional step of the media session method of FIG. 1. The method continues from step S1 of FIG. 1. In this embodiment, the bandwidth share information comprises at least two bandwidth share values, where each such value is associated with a defined bandwidth level set or operation point as described above. In a next step S40, a bandwidth share value is identified from the at least two values. This identification is performed based on a comparison between the determined available bandwidth level and the different defined bandwidth level sets associated with the share values. Thus, this comparison typically involves identifying that level set that encompasses or is equal to the determined bandwidth level. The share value associated with the level set encompassing or being equal to the available bandwidth level is then employed in the providing steps S2 and S3 of FIG. 1. Thus, in these steps, media content versions of the at least two media contents of the content group are provided based on the available bandwidth level and the identified bandwidth share value.

In an alternative implementation of step S40, the bandwidth share information comprises at least two bandwidth share values, where each such value is associated with a defined time period of the media session. Thus, the bandwidth share information is time-dependent. The selection of share value to employ is then typically determined based on time stamps provided in the first and/or second media content. This is particularly useful when a media content is regarded as being divided into a number of consecutive media samples that are to be transmitted to and rendered at the client one after another. In such a case, share values can be associated with different such consecutive samples to provide time-dependency.

In addition to being associated with the bandwidth share information of the invention, the media content group can also include a maximum pre-defined bandwidth threshold and/or a minimum pre-defined bandwidth threshold for one or more of its included media contents.

The maximum bandwidth threshold indicates an upper threshold value for which bandwidth should be allocated to the media content. A higher bandwidth share, as determined based on the total available bandwidth level and the share information, than the maximum threshold should preferably only be allocated if all other media content in the session has fulfilled their quotas for target bandwidth share and maximum bandwidth thresholds. If a zero value is includes, this preferably indicates that no information on maximum bandwidth threshold is provided.

The minimum bandwidth threshold indicates a lower threshold value for which bandwidth should be allocated to the media content. If the allocated bandwidth, as determined based on the total available bandwidth level and the share information, would be lower than the minimum threshold, then no bandwidth is preferably allocated to the media content in question. Instead preference is preferably given to other media content in the session. A minimum bandwidth threshold of zero preferably indicates that no information on the minimum bandwidth level is provided.

In consistency with employing target bandwidth shares for the media content that can be bandwidth- and/or time-dependent or static, the maximum and/or minimum bandwidth thresholds may also be bandwidth- and/or time-dependent or static.

Figure 6:
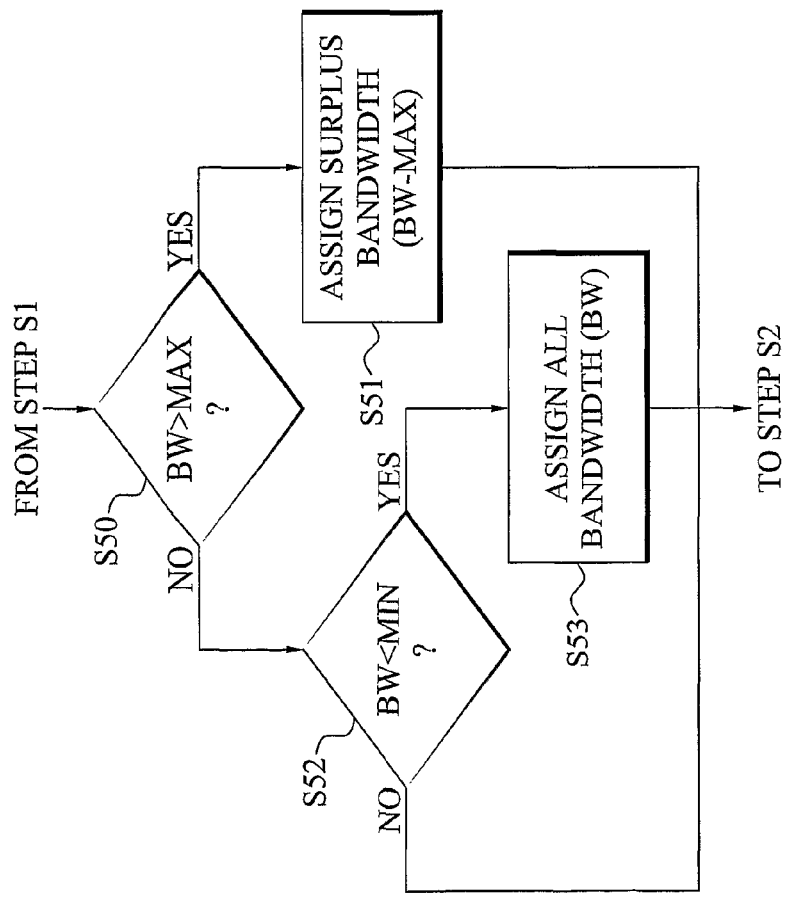
FIG. 6 is a flow diagram illustrating additional steps of the media session managing method of FIG. 1.

FIG. 6 is a flow diagram illustrating additional steps of the media session method of FIG. 1 with usage of maximum and minimum pre-defined bandwidth thresholds. In the description of FIG. 6, it is assumed that the maximum and minimum bandwidth thresholds are associated with the first media content. This should, however, merely be seen as illustrative examples. These maximum and minimum thresholds could alternatively be applied to the second media content or different thresholds are assigned to the first and second content. In further embodiments, only the maximum or minimum thresholds are used for the first and/or second media content. The method continues from step S1 of FIG. 1. In a next step S50, it is determined whether the bandwidth assignable to the first media content exceeds the maximum bandwidth threshold associated with this content. If this is true the method continues to step S51, where surplus bandwidth, i.e. bandwidth level assignable to the first content subtracted by maximum threshold, is assigned to the second media content and is added to the bandwidth level assignable to this second content. If, however, the assignable bandwidth level is below the maximum threshold, the method continues to step S52, which determines whether the bandwidth level assignable to the first content is below the minimum threshold. In such a case, the method continues to step S53, where all bandwidth available for the media group is assigned to the second media content. Following steps S51 and S53 or if the assignable bandwidth level is within the interval defined by the maximum and minimum thresholds, the method continues to step S2 of FIG. 6.

It anticipated by the present invention that the order of comparison may be switched in the figure, i.e. the current assignable bandwidth level is first compared to the minimum threshold and then the maximum threshold if the minimum threshold is exceeded. Furthermore, if a media content is merely associated with a maximum or a minimum threshold only the steps S50, S51 or S52, S53 of FIG. 6 are performed.

The usage of maximum and minimum thresholds and bandwidth share information as illustrated in FIG. 6 is an example implementation. Another implementation possibility is to first assign bandwidth according to the minimum thresholds of the first and second media. Any remaining bandwidth is then allocable according to the bandwidth share information and the maximum thresholds.

FIGS. 8 to 12 schematically illustrate possible scenarios of different media contents and provisions of media content versions according to the present invention. In these figures, it is, non-limitedly, assumed that the first media content 30 of the media group is video content and that the second media content 40 is audio content. In addition, each audio or video content version is regarded as an audio or video track or stream. These media tracks could, for example, be stored in a container file, such as the ISO base media file format. The bandwidth share information is also assumed to include rate share information of bit rate levels of the media. In connection with these figures, the two expressions "alternate group" and "switch group" are introduced. There is, for each media content of the media content group, an alternate group. For example, alternate group 1 denotes audio data and alternate group 2 denotes video data. Switch group denotes a group of alternative media tracks of an alternate group. Note that a single alternate group can have one or multiple switch groups. During an ongoing media session, it is possible to switch between media tracks within the same switch group but not between media tracks of different switch groups. All the values of the share information and the pre-encoded rate levels of the audio and video presented in connection with FIGS. 8 to 12 should merely be seen as non-limiting example values.

FIG. 8 illustrates the case where the media content group comprises multiple (two illustrated in the figure) fixed-rate encoded video tracks 32, 34 and multiple (two illustrated in the figure) fixed-rate encoded audio tracks 42, 44. Table 1 below schematically illustrates a possible division of the media tracks 32, 34; 42, 44 into alternate and switch groups.

TABLE 1 fixed-rate audio and video tracks

| Track ID | Content | Alternate group | Switch group |
|---|---|---|---|
| 1 | Audio at 58 kbps | 1 | 1 |
| 2 | Audio at 72 kbps | 1 | 1 |
| 3 | Video at 128 kbps | 2 | 2 |
| 4 | Video at 160 kbps | 2 | 2 |

The rate share information associated with this media group could be: Video=70%. If the total available bit rate is 230 kbps, this corresponds to 0.70×230=161 kbps. Hence, the video track 4 (corresponds to reference number 34 in figure) pre-encoded to 160 kbps is a suitable choice as video content version for the current session. The corresponding bit rate assignable to the audio content is 69 kbps. A good selection is therefore track 2 (corresponds to reference number 44) pre-encoded to 72 kbps. If the available bit rate would drop during the media session to 180 kbps, this would amount to 126 kbps assignable to video and 54 kbps assignable to video. In such a case, it is better to switch, during the ongoing session, from track 4 to track 3 pre-encoded to 128 kbps and switch from track 2 to track 1 pre-encoded to 58 kbps.

Figure 9:
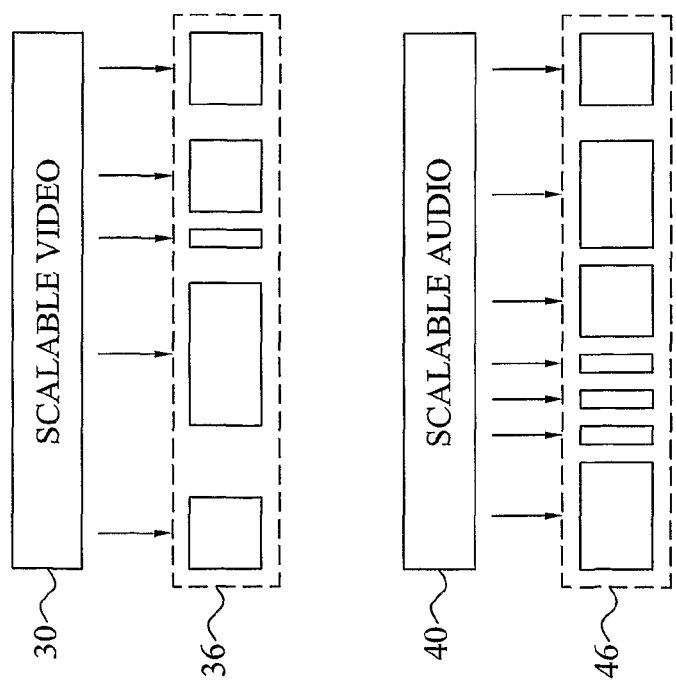
FIG. 9 is a diagram schematically illustrating provision of media content versions according to a second embodiment of the present invention.

FIG. 9 illustrates the case where the media content group comprises scalable video 30 and scalable audio 40. Table 2 below schematically illustrates a possible division of the media tracks 30; 40 into alternate and switch groups.

TABLE 2 scalable audio and video tracks

| Track ID | Content | Alternate group | Switch group |
|---|---|---|---|
| 1 | Scalable video | 1 | 1 |
| 2 | Scalable audio | 2 | 2 |

The rate share information associated with this media content group could be as defined in Table 3 below.

TABLE 3 rate share information

| Track ID | Target rate share | Maximum bit rate | Minimum bit rate |
|---|---|---|---|
| 1 | 40 | 128 | 0 |
| 2 | 60 | 0 | 30 |

The values in Table 3 imply that audio should be extracted such that it allocates 40% of the available bit rate and video should be extracted such that it allocates the rest (60%). The resulting extracted video and audio versions are denoted 36 and 46, respectively, in the figure. If the available bit rate equals 320 kbps, audio would get 128 kbps and video 192 kbps. In this case, the assignable bit rate for audio equals its maximum bit rate. Any increase of the available bit rate should therefore be allocated to video only. If the available bit rate would be less than 50 kbps, then video would correspond to less than 30 kbps. However, as the minimum bit rate for video is set to 30 kbps in this example, only audio will be served (at the full available bit rate) in this case.

Figure 10:
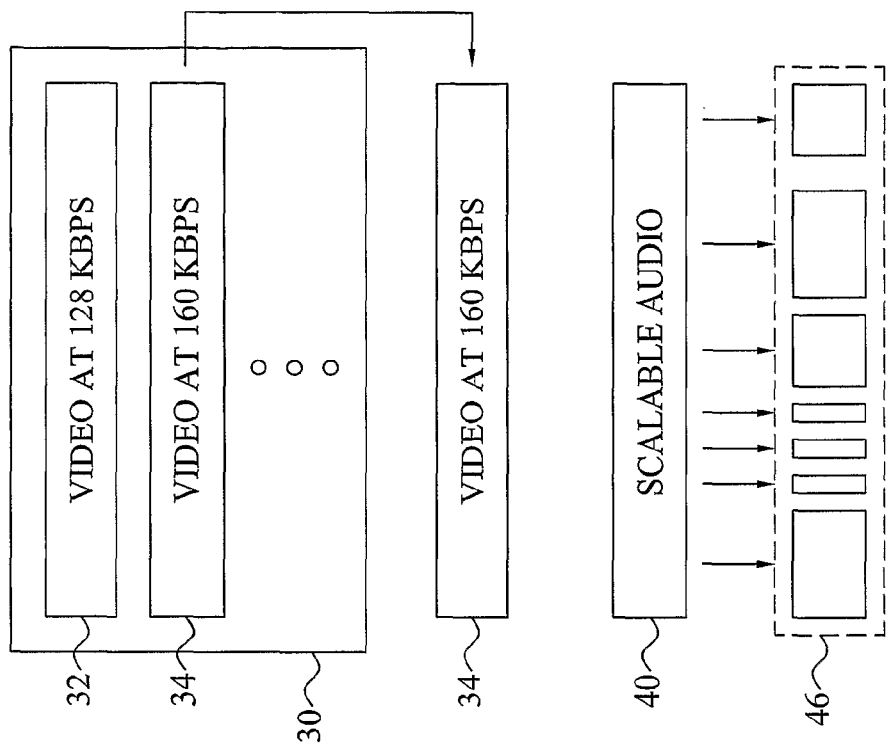
FIG. 10 is a diagram schematically illustrating provision of media content versions according to a third embodiment of the present invention.

FIG. 10 illustrates the case with multiple fixed-rate encoded video tracks and scalable audio. Table 4 below schematically illustrates a possible division of the media tracks 32, 34; 40 into alternate and switch groups.

TABLE 4 fixed-rate video and scalable audio tracks

| Track ID | Content | Alternate group | Switch group |
|---|---|---|---|
| 1 | Scalable audio | 1 | 1 |
| 2 | Video at 128 kbps | 2 | 2 |
| 3 | Video at 160 kbps | 2 | 2 |

In this example, the rate share information may be provided only for the audio track. At a certain time interval (in the case time-dependent rate share information is used) the following values may be specified: target rate share 30%, maximum bit rate 128 kbps and minimum bit rate 0. The audio target rate share of 30% implies that the video target rate share is 70%. If the total available bit rate is 230 kbps, this corresponds to 161 kbps for video. Hence, track no. 3 (reference sign number 34 in the figure) is preferably selected for video, whereas an audio version 46 corresponding to a bit rate of 131 kbps is formed by extracting audio data from the scalable audio track 40.

Figure 11:
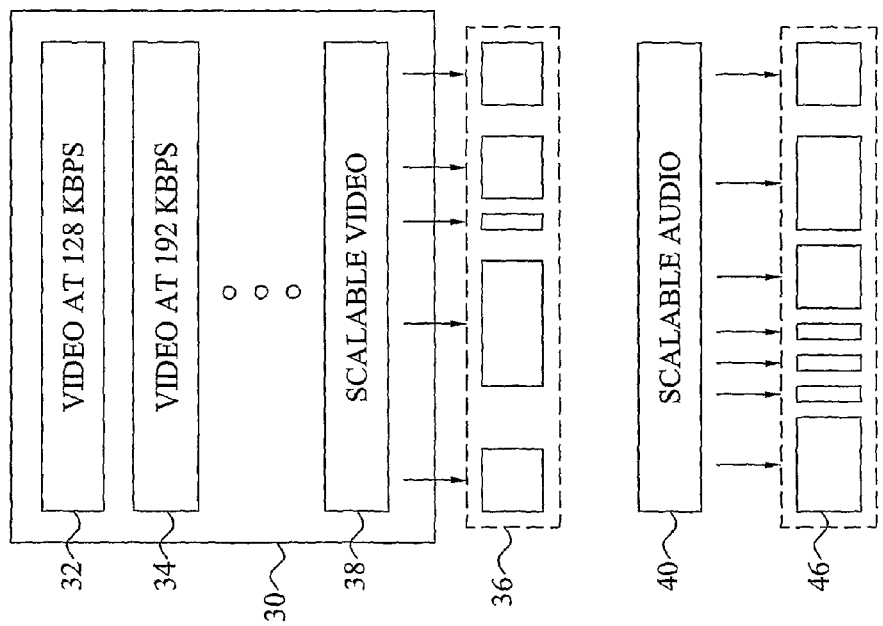
FIG. 11 is a diagram schematically illustrating provision of media content versions according to a fourth embodiment of the present invention.

FIG. 11 illustrates the case with multiple fixed-rate encoded video tracks, a scalable video track and scalable audio. Table 5 below schematically illustrates a possible division of the media tracks 32, 34, 38; 40 into alternate and switch groups.

TABLE 5 fixed-rate video, scalable video and audio tracks

| Track ID | Content | Alternate group | Switch group |
|---|---|---|---|
| 1 | Scalable audio | 1 | 1 |
| 2 | Scalable video | 2 | 2 |
| 3 | Video at 128 kbps | 2 | 3 |
| 4 | Video at 192 kbps | 2 | 3 |

In this example all video tracks are in the same alternate group and therefore they represent the same content. However, only one video track should be served at any point in time in combination with the audio track. Before the start of transmission of media data, the media server needs to make a decision of whether video data from the scalable video track (switch group 2) or from the fixed-rate video tracks (switch group 3) should be used throughout the session. Once this decision has been made, switches between video content versions can only be conducted within the selected switch group. This decision can be made based on varying factors. For example, some clients may lack capability of managing scalable video (or audio). In such a case, only the video tracks of switch group 3 are of interest. Furthermore, certain tracks could be unsuitable for the current situation. For example, if the current bit rate assignable to video is much higher (lower)

than the fixed rate used for pre-encoding the video track with the lowest (highest) bit rate, none of the fixed-rate encoded video tracks is a good choice for the current bit rate situation. In this case, it might be better to provide a video content version 36 from the scalable video track 38.

Figure 12:
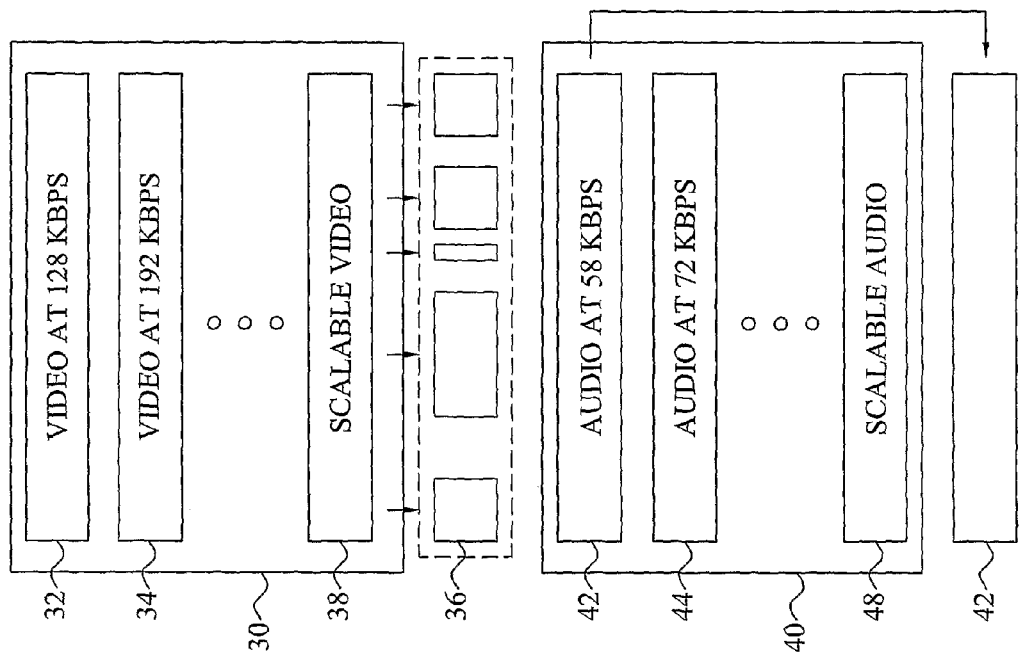
FIG. 12 is a diagram schematically illustrating provision of media content versions according to a fifth embodiment of the present invention.

FIG. 12 extends this concept a bit further by providing both fixed-rate encoded and scalable audio and video. Table 6 below schematically illustrates a possible division of the media tracks 32, 34, 38; 42, 44, 48 into alternate and switch groups.

TABLE 6 fixed-rate and scalable video and audio tracks

| Track ID | Content | Alternate group | Switch group |
|---|---|---|---|
| 1 | Scalable audio | 1 | 1 |
| 2 | Audio at 58 kbps | 1 | 2 |
| 3 | Audio at 72 kbps | 1 | 2 |
| 4 | Scalable video | 2 | 3 |
| 5 | Video at 128 kbps | 2 | 4 |
| 6 | Video at 192 kbps | 2 | 4 |

As has been illustrated in the above given examples, in the case of fixed-rate encoded audio or video content versions, the content version being pre-encoded at the bit rate level being closest to the currently available bit rate for that content, as determined based on the rate share information and the total available bit rate level, is preferably selected. In the case the currently available bit rate for a media is exactly in the middle between two fixed-rate levels, such as 65 kbps for audio at 58 kbps and audio at 72 kbps, either content version could be selected.

The ISO base media file format [1, 2] can advantageously be employed in connection with the media data and bandwidth share information of the present invention. Alternative container file formats include, the MP4 file format, 3GP file format and QuickTime format. The ISO base media file may contain multiple media tracks, such as audio and video tracks. Thus, multiple potential versions of a media content can be provided as multiple pre-encoded media tracks and/or in the form of a scalable media track. The bandwidth share information of the present invention can be included in a separate track, such as in a so-called hint track of the media file format. However, rather than dedicating a separate track to store bandwidth share information, it might be easier and more flexible to store the share information in the media tracks themselves. In this way, the bandwidth share information can, in a simple manner, be provided in the time scale of the media. It is anticipated by the invention that the container file can include information, such as a meta-data track, that can be used by a streaming server when compiling media streams during a session.

The purpose of the bandwidth share information of the invention is to aid a media server when providing media content (extracting media data or selected pre-encoded content version). In this way, a media server can use the bandwidth share information as directions on how scalable media streams or multiple pre-encoded media streams can be optimally combined. This information is only intended for consumption by the media server and is generally not part of the stored or transmitted streams. Several tracks of an ISO file are preferably served simultaneously if the belong to different alternate groups (video and audio). By default, all tracks could be served simultaneously if no alternate groups are defined.

In a preferred implementation, the default rule for bandwidth rate share values is the following. If target bandwidth share is defined (for an operation point at a certain time) for at least one track in the session, then tracks that do not have any target bandwidth share explicitly specified (for that operation point and that time) preferably implicitly share the surplus bandwidth share equally, such that the total allocation of bandwidth share adds up to 100%. As all tracks within an alternate group are alternatives or versions of the same media content, they should have the same target bandwidth share values.

In the case all tracks have explicit target share values and they do not sum up to 100%, the share values can be regarded as weights (after normalization). In a typical bandwidth allocation using the bandwidth share information, an initial bandwidth allocation for each track is made independently. If a track uses less than its target rate share there will be an excess bandwidth. This may for instance happen when no suitable bandwidth level is available or as a result of applying the minimum and maximum bandwidth thresholds. Thereafter, the tracks that have not reached their maximum thresholds are revisited and offered the total excessive bandwidth. In this allocation of excessive bandwidth, priority is preferably given to tracks that have been cut off due to their minimum thresholds. An alternative approach is to offer the excessive bandwidth in priority of track IDs.

Figure 13:
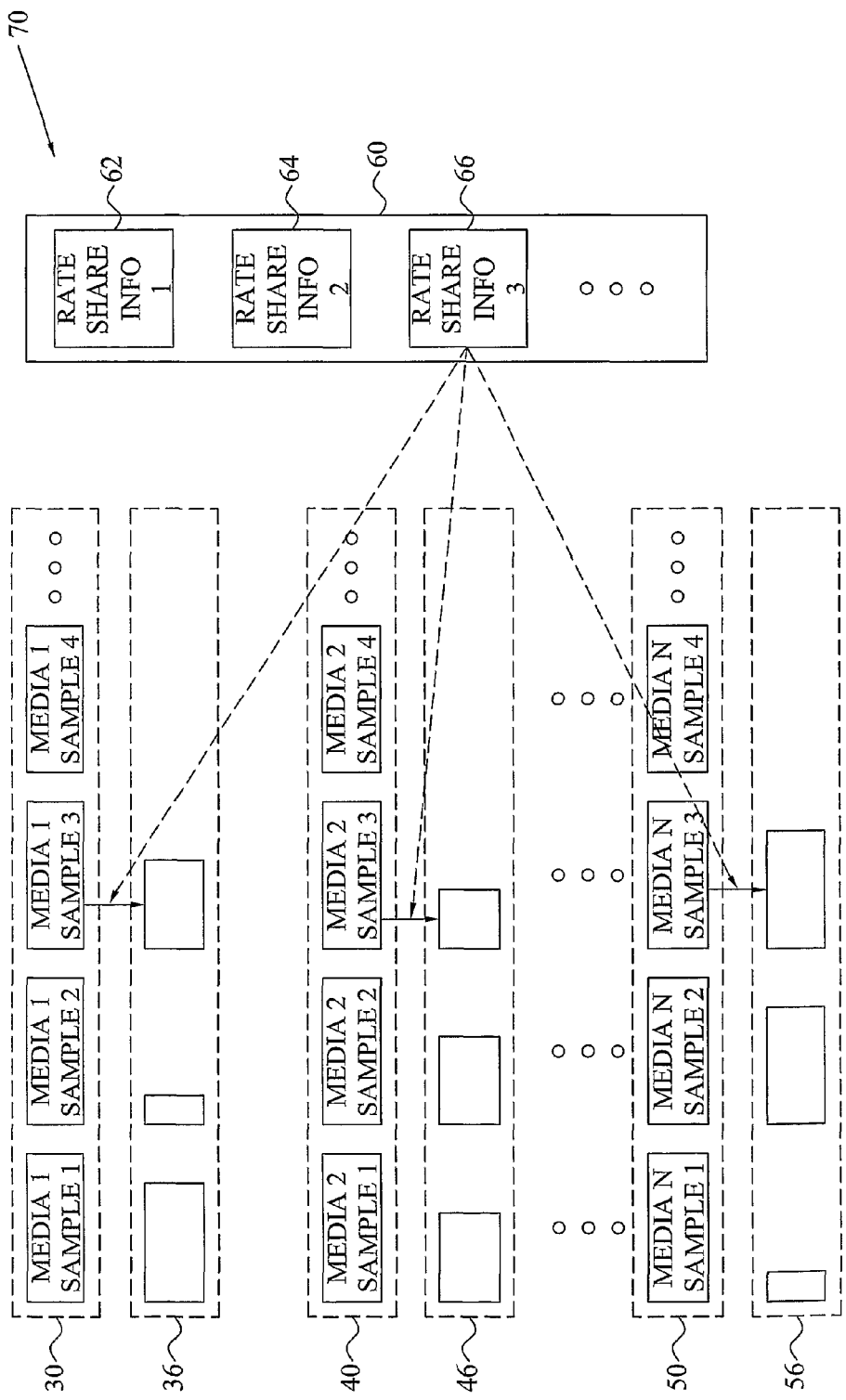
FIG. 13 is a diagram schematically illustrating provision of media content versions contained in a container file according to the present invention.

FIG. 13 is a schematic overview of a container file 70 containing multiple (scalable) media tracks 30, 40, 50 and a hint track 60 with bandwidth share information 62, 64, 66 of the present invention. The file 70 can, preferably, be an ISO base media file. In FIG. 13, the different bandwidth shares 62, 64, 66 of the hint track 60 can be adapted for usage within different time intervals and/or at different bandwidth intervals. The figure also schematically illustrates how a currently selected bandwidth share value is employed, together with information of the current available bandwidth level, for extracting media data from the scalable media tracks 30, 40, 50 to form "optimal" versions or samples 36, 46, 56 of the tracks 30, 40, 50. As was described in the foregoing, the bandwidth share information 62, 64, 66 can be included in a separate hint track 60 as illustrated in FIG. 13. However, in an alternative approach, the information 62, 64, 66 are stored separately or in connection with the media tracks 30, 40, 50.

In a typical implementation example of the invention, a track 30, 40, 50 in the media container file 70 comprises a number of media samples or blocks as illustrated in FIG. 13. Each such sample has a given start time and a duration time. A preferred implementation of the invention applies the rate share information 62, 64, 66 to the duration of a media sample. However, as the information 62, 64, 66 may apply to many consecutive samples of a track 30, 40, 50, the rate share information 62, 64, 66 can be efficiently stored in a track by using sample groups. Each sample of a track 30, 40, 50 may be associated to (zero or) one of a number of sample group descriptions, each of which defines a record of rate share information. This rate share record preferably comprises, in addition to the rate share information of the invention, also the maximum and minimum bit rate thresholds.

In such a case, the grouping type 'rash' can be defined as the grouping criterion for rate share information. Zero or one sample-to-group box ('sbgp') for the grouping type 'rash' can be contained in the sample table box ('stbl') of a track. This could reside in a hint track, if used, otherwise it may be included in the media tracks.

The rate share sample group entry can be defined as below:

```
class RateShareEntry( ) extends SampleGroupDescriptionEntry('rash')
{
    unsigned int(16) target_rate_share;
    unsigned int(32) maximum_bitrate;
    unsigned int(32) minimum_bitrate;
}
```

An alternative implementation is given below:

```
class RateShareEntry( ) extends SampleGroupDescriptionEntry('rash')
{
    unsigned int(16)operation_point_count;
    for (i=1; i <= operation_point_count; i++)
    {
        unsigned int(16) target_rate_share;
    }
    unsigned int(32)maximum_bitrate;
    unsigned int(32)minimum_bitrate;
}
```

The semantic is given by the following definitions:
operation_point_count: This is an integer that gives the number of operation points specified in the following list. Note that if the file does not contain a Rate share operation point box ('rsop'), then only one operation point is defined. If the file contains a Rate share operation point box, then operation_point_count shall not exceed the number of operation points specified there. The $N^{th}$ entry in the following list corresponds to the $N^{th}$ operation point in the Rate share operation point box.
target_rate_share: A non-zero value indicates the percentage of available bandwidth that should be allocated to the media. A zero value indicates that no information on the preferred rate share percentage is provided. In the implementation with operation points, the value of the first (last) operation point applies to lower (higher) available bit rates than the operation point itself. The target share rate between operation points is bounded by the target shares of the corresponding operation points.
maximum_bitrate: A non-zero value indicates (in kilobits per second) an upper threshold for which bandwidth should be allocated to the media. A higher bit rate than maximum bit rate should only be allocated if all other media in the session has fulfilled their quotas for target rate share and maximum bit rate, respectively. A zero value indicates that no information on maximum bit rate is provided.
minimum_bitrate: A non-zero value indicates (in kilobits per second) a lower threshold for which bandwidth should be allocated to the media. If the allocated bandwidth would correspond to a lower value, then no bit rate should be allocated. Instead preference should be given to other media in the session or alternate encodings of the same media. Zero minimum bit rate indicates that no information on maximum bit rate is provided.

If more than one operation point is used to specify target rate share, the Movie box ('moov') should contain one Rate share operation point box ('rsop') as defined below:

```
aligned(8) class RateShareOperationBox extends FullBox('rsop',
    version=0, 0)
{
    unsigned int(16) operation_point_count;
    for (i=1; i <= operation_point_count; i++)
    {
        unsigned int(32) available bitrate;
    }
}
```

Semantics:
operation_point_count is an integer that gives the number of operation points.
available_bitrate is a positive integer that defines an operation point (in kilobits per second). Each entry shall be greater than the previous entry.

FIG. 14 is a flow diagram of a method of generating a media content group according to the present invention. The method starts in step S60, where a first media content is generated or provided. This first media content is generated to have multiple potential content versions that each is adapted to a respective bandwidth level. This first media content could be a video or audio content. In a following step S61 a second media content is generated or provided. This is preferably a content associated with and to be collectively managed with the first content and subsequently collectively rendered with the first media content in a client. In line with the first content, the second media content is generated to have multiple potential versions that are adapted to different respective bandwidth levels. The generating steps S60 and S61 can be performed by processing input media data to form scalable versions of the media data. In these processes, known prior art techniques for generating scalable audio and video (or other media types) will be employed. Alternatively, or in addition, multiple discrete content versions of the first and/or second media content can be generated. In such a case, each such content version is encoded to be adapted or optimized for usage in connection with a specific bandwidth level or bandwidth level interval.

The input media data employed in these generating steps can, for example, be obtained through recording of a football game, a news covering or any other recording. Correspondingly, the media data could be "artificially" generated at a content creator, e.g. being in the form of an animated cartoon. Actually any form of media data can be employed according to this embodiment of the present invention.

Additional media content generating steps are of cause present if the media content group is to include more media contents besides the first and second media content.

In a next step S62, bandwidth share information is determined for the media group. This share information enables estimation of a respective apportionment of an available bandwidth level to the first and second content. In addition, the information enables selection of a version of the multiple potential versions of the first content and a version of the multiple potential versions of the second content. In this selection, the share information is used together with information of the available bandwidth level as previously described herein.

In a particular embodiment of the invention, the bandwidth share information is time-dependent, implying that different portions of the media content is associated with different bandwidth share values. Alternatively, or in addition, the bandwidth share information can be bandwidth-dependent. In such a case, the information preferably includes at least two bandwidth share values that are intended to be used at different bandwidth level sets or intervals.

In a next step S63, the generated bandwidth share information is associated with the media content group. Any association or connection between the information and the media contents can be used as long as it is possible for a media server to retrieve and use the bandwidth share information during a media session for compiling media data of the first and second media content.

If the ISO base media file is used as a container file for the media content and the bandwidth share information, the first media content can be provided in the file as at least one media track (one track if only provided as scalable media and otherwise one track per content version) and one or more media tracks for the second media content. The association of the share information to the media content can then be implemented in the form of including the share information in a separate hint track in the file. This hint track is regarded as meta-data to be associated and used for processing the different media tracks. In an alternative approach the bandwidth share information is included in at least one of the media tracks for the first and/or second media content.

The method then ends.

The bandwidth share information of the invention can be generated by digital content creations tools. For example, an automatic process could be employed for the information generation, where the determination of scaling directions (for scalable media content) or optimal content versions can be automated by using (intelligent) software modules. In such a case, the software modules preferably determine the share information based on the actual content, specific (scalable) media codecs and a joint media (e.g. audio-visual) objective quality measure. Instead of employing an automatic process, the share information generation can be conducted in a manual process, in which an experienced and knowledgeable content creator tunes scaling directions, by using, for example, a graphical user interface, to find "optimal" scaling directions leading to good end-user experienced quality when rendering the media.

Figure 15:
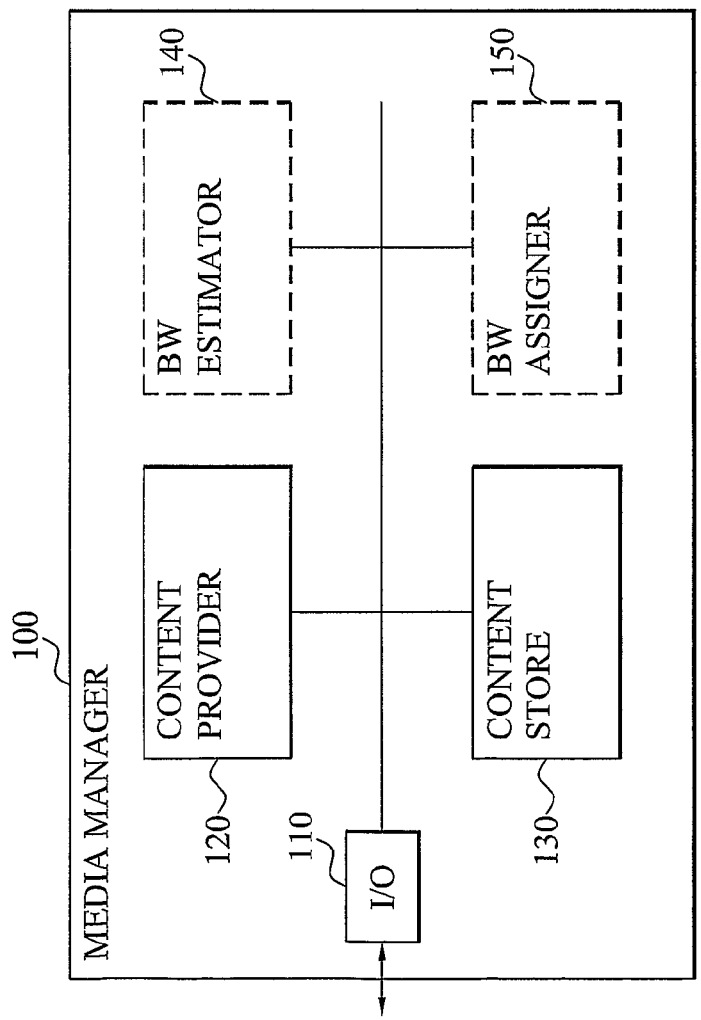
FIG. 15 is a schematic block diagram of a media manager according to a further aspect of the present invention.

FIG. 15 is a block diagram of a media manager 100 according to the present invention. The media manager 100 generally includes an input and output (I/O) unit 110 collectively representing equipment and modules (such as antenna, modulator/demodulator, encoder/decoder, etc.) necessary for conducting communication with external units. The I/O unit 110 is in particular arranged for receiving requests for media content from clients and for transmitting requested content to such clients. The media transmission can be conducted through a wired connection, but is preferably in the form of wireless, radio-based data transmission.

The media manager 100 also comprises a media content provider 120 arranged for providing media content versions of media content collectively forming a media group. The media data of this media group can have been received by the I/O unit 110 from an external unit, such as a content creator, be provided from a content or data store/memory 130 in the media manager 100 or actually be generated by the media manager 100 itself. In either case, the provider 120 provides a content version of the first media content of the group and provides a content version of the second media content of the group. If the content group comprises more than two different media contents, a content version is preferably provided by the content provider 120 for each such content. The content provider 120 uses bandwidth share information associated with the media group in this version provision. In addition, an available bandwidth level assigned for transmission of media data of the at least two media contents using at least one transmission carrier is also employed by the content provider 120 together with the share information when providing content versions.

The media manager 100 preferably comprises or has access to a bandwidth estimator 140. This estimator is then arranged for estimating a bandwidth level assignable to the first media content and a bandwidth level assignable to the second media content. In this estimation procedure, the bandwidth estimator 140 employs the bandwidth share information associated with the media and information of the total bandwidth level available for the media. The information of the estimated respective assignable levels is then forwarded to the content provider 120 for usage when providing content versions. The content provider 120 provides the content version of the first media content based on the estimated bandwidth level assignable for this content. Correspondingly, the provider 120 uses information of the bandwidth level assignable to the second content for providing a version of the multiple potential versions of the second content.

The bandwidth estimator 140 or some other unit may also optionally be used for estimating or determining a current total bandwidth level available for media data transmission.

In an optional but preferred embodiment, the media manager 100 comprises a bandwidth assigner 150. This bandwidth assigner 150 uses pre-defined maximum and/or minimum bandwidth thresholds included in the bandwidth share information or associated therewith. The bandwidth assigner 150 compares, preferably for each media content having an assigned pre-defined threshold, whether the bandwidth level assignable to that media, as determined by the estimator 140, exceeds the maximum threshold or is below the minimum threshold. In the former case, the bandwidth assigner 150 assigns the surplus bandwidth (assignable bandwidth subtracted by maximum threshold) to the other media content(s) of the media group. However, in the latter case, the bandwidth assigner 150 assigns all bandwidth originally assignable to the given media, as determined by the estimator 140, to the other media content(s) of the group.

The media content versions provided by the content provider 120 are forwarded to the I/O unit 110 for transmission to the requesting client(s). In this transmission, the bandwidth levels (bit rates) determined for the different medias by the estimator 140 and possibly the assigner 150 will be used by the I/O unit 110 for conducting this transmission using at least one transmission carrier. The media transmission of the invention could, for example, be conducted in the form of media streaming or media downloading.

If the bandwidth share information comprises time-dependent bandwidth shares, the content provider 120 preferably updates the media version provisions over time during the ongoing media session to cope with the time-dependency of the share information. In addition, or alternatively, the share information can be bandwidth-dependent. In such a case, the content provider 120 preferably updates the media version provisions during the ongoing media session as the total bandwidth level available to the media content group/session changes.

The units 110, 120, 140 and 150 of the media manager 100 may be implemented or provided as software, hardware or a combination thereof. The units 110 to 150 may all be implemented in the media manager 100 in a single network node in a communications system. For example, the media manager 100 can constitute or be a part of a streaming server, downloading server or other media server arranged in a network node. Alternatively, a distributed implementation is also possible and within the scope of the invention. In such a case, different units 110 to 150 of the media manager 100 may be arranged in different network nodes but will despite this perform their intended operations as described in the foregoing.

Figure 16:
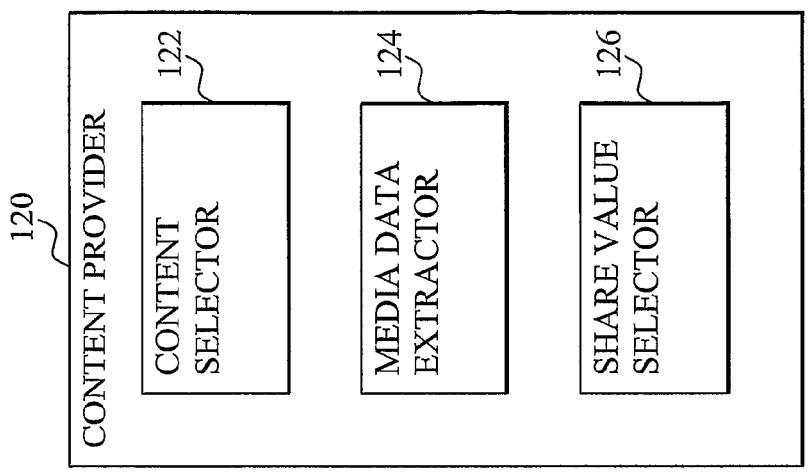
FIG. 16 is a schematic block diagram illustrating an embodiment of the content provider of FIG. 15 in more detail.

FIG. 16 is a schematic block diagram of an embodiment of the content provider 120 of the media manager in FIG. 15. This content provider 120 comprises a content version selector 122. This selector 122 uses the bandwidth share information and total available bandwidth level (or some quantity derivable therefrom, such as bandwidth of the total available bandwidth assignable to the different contents) for selecting a version of multiple pre-defined versions of the first and/or second media content. Each such content version is adapted for a respective pre-defined bandwidth level or bandwidth interval. In a typical implementation, the content versions are digitally encoded to different fixed bandwidth levels. In such a case, the content selector 122 selects the content version that is most suitable in terms of user-quality when being rendered by a client in the current situation, i.e. fits best to the bandwidth level assignable to the particular media.

The content provider 120 can instead or in addition include a media data extractor 124. This extractor 124 is provided for managing media content provided as scalable media. The extractor 124 extracts media data from the scalable content to form a suitable content version. This media extraction is further performed based on the bandwidth share information and information of the total available bandwidth level for the media group. Using information of the bandwidth share and total available bandwidth (or a quantity derived therefrom) an "optimal" content version of the scalable media can be provided by the extractor 124.

If the bandwidth share information is time-dependent and/or bandwidth-dependent, the information preferably includes at least two share values intended for usage at different time intervals of the media transmission and/or at different available bandwidth levels/intervals. The content provider 120 therefore preferably comprises or has access to a share value selector 126 arranged for selecting a bandwidth share value from the share information. This value selection is preferably performed based on a comparison between the total available bandwidth level and the different bandwidth intervals associated with the share values in the case of bandwidth-dependent share information. Correspondingly for time-dependent information, the current media time, e.g. as determined based on time stamps included in the media content, can be used by the value selector 126 for selecting the share value to use at a current instance. The selected bandwidth share value is then preferably forwarded to the content selector 122 and/or media data extractor 124 for usage when providing media content versions.

The units 122 to 126 of the content provider 120 may be implemented or provided as software, hardware or a combination thereof. The units 122 to 126 may all be implemented in the content provider 120. Alternatively, a distributed implementation is possible with at least one of the units 122 to 126 provided elsewhere in the media manager.

FIG. 17A is schematic overview of a portion of a wireless, radio-based communications system 1 comprising a streaming server 300 housing a media manger 100 according to the present invention. In such a case, the streaming server 300 can use the share information of the invention to provider media content versions that are collectively sent to a client 10, illustrated by a mobile telephone, through usage of a connected network node or base station 20 using at least one transmission carrier 25.

The client 10 can actually be any communicating unit or terminal having media content rendering capability (media player). Typical, but non-limiting examples, includes computers, laptops, game consoles having communication capabilities, mobile telephones, Person Digital Assistants (PDAs), etc.

FIG. 17B illustrates another possible scenario that benefits from present invention. In this case, the media manager 100 is housed within a user terminal 15, from which media data is downloaded or streamed to another user terminal or client 10 using at least one transmission carrier 25. This media transmission is typically conducted through at least one intermediate network node or base station 20 as illustrated in the figure.

FIG. 18 is a schematic block diagram of a media engine or creator 200 according to the present invention. This media engine 200 comprises a general I/O unit 210 for conducting communication with external units. This I/O unit 210 is in particular configured for transmitting a file containing media contents of a media group and bandwidth share information of the invention to different media servers or media managers. The engine 200 also comprises a content generator 220 for generating at least a first media content having multiple potential media versions and a second media content, correspondingly, having multiple potential media versions. Each of the potential versions of the at least two contents is adapted to a respective bandwidth level and the at least two media contents are intended to be collectively managed in a media session and preferably collectively rendered in a client.

An information generator 230 of the media engine 200 is arranged for generating bandwidth share information for the media content group consisting of the at least first and second content. This share information enables estimation of a respective apportionment of a total bandwidth level available to the media group for transmission using at least one carrier during the media session. In addition, the share information enables selection of a respective content version of the multiple potential versions of the first and second contents based on the total available bandwidth level.

An information assigner 240 of the media engine 200 connected to the content generator 220 and the information generator 230 assigns or associates the bandwidth share information from the information generator 230 with the media content group provided by the content generator 220. In a typical implementation, the content generator 220 inserts the potential versions of the first and second media content as different media tracks in a container file, such as the ISO base media file. In such a case, the assigner 240 can insert the bandwidth share information from the generator 230 in the file as a dedicated hint track (meta-data) or include the information in at least one of the media tracks.

The units 210 to 240 of the media engine 200 may be implemented or provided as software, hardware or a combination thereof.

It will be understood by a person skilled in the art that various modifications and changes may be made to the present invention without departure from the scope thereof, which is defined by the appended claims.

REFERENCES

[1] ISO/IEC 14496-12:2005: "ISO base media file format"
[2] ISO/IEC 15444-12:2005: "ISO base media file format"

The invention claimed is:
1. A media session method of collectively managing media data of a media content group comprising at least a first media content and a second media content, said method comprising the steps of:

providing a media container file comprising:
i) said first media content available in the form of multiple potential versions, each of said multiple potential versions of said first media content being adapted for a respective bandwidth level; and
ii) said second media content available in the form of multiple potential versions, each of said multiple potential versions of said second media content being adapted for a respective bandwidth level;
providing a version of said multiple potential versions of said first media content; and
providing a version of said multiple potential versions of said second media content;
wherein said media container file comprises bandwidth share information comprising a target percentage of an available bandwidth level assigned for transmission of media data of said first and second media content using at least one transmission carrier, said target percentage of said available bandwidth level is to be allocated to said first media content for transmission using said at least one transmission carrier;
determining, based on said available bandwidth level and said bandwidth share information, a bandwidth level available for said first media content; and
determining, based on said available bandwidth level and said bandwidth share information, a bandwidth level available for said second media content;
wherein providing said version of said multiple potential versions of said first media content comprises providing, based on said determined bandwidth level available for said first media content, said version of said multiple potential versions of said first media content; and
wherein providing said version of said multiple potential versions of said second media content comprises providing, based on said determined bandwidth level available for said second media content, said version of said multiple potential versions of said second media content.

2. The method according to claim 1, further comprising the step of:
collectively transmitting said provided versions using said at least one transmission carrier.

3. The method according to claim 1, wherein said step of providing said first version of said first media content comprises the step of:
selecting, based on said available bandwidth level and said bandwidth share information, a version of multiple pre-defined versions of said first media content, each of said multiple pre-defined versions of said first media content being adapted for a respective pre-defined bandwidth level.

4. The method according to claim 1, wherein said second media content is a scalable media content and said step of providing said version of said second media content comprises the step of: extracting, based on said available bandwidth level and said bandwidth share information, media data from said second media content to provide a version of said second media content adapted for a defined bandwidth level.

5. The method according to claim 1, wherein said bandwidth share information comprises at least two bandwidth share values, each value being associated with a defined bandwidth level set, and said method comprising the step of:
identifying a bandwidth share value based on a comparison between said available bandwidth level and said defined bandwidth level sets associated with said at least two bandwidth share values, and said providing steps comprises the steps of:

providing, based on said available bandwidth level and said identified bandwidth share value, a version of said multiple potential versions of said first media content; and
providing, based on said available bandwidth level and said bandwidth share value, a version of said multiple potential versions of said second media content.

6. The method according to claim 1, wherein said first media content is associated with a maximum pre-defined bandwidth threshold, and said method comprising the further step of assigning, if said determined bandwidth level available for said first media content exceeds said maximum pre-defined bandwidth threshold, surplus available bandwidth to said second media content.

7. The method according to claim 1, wherein said first media content is associated with a minimum pre-defined bandwidth threshold, and said method comprising the further step of: assigning, if said determined bandwidth level available for said first media content is below said minimum pre-defined bandwidth threshold, all available bandwidth to said second media content.

8. The method according to claim 1, wherein said bandwidth share information comprises time-dependent bandwidth share information associated with said media content group and said method comprising the further step of: providing, based on said available bandwidth level and said time-dependent bandwidth share information, a version of said multiple potential versions of said first media content.

9. The method according to claim 1, wherein said available bandwidth level is an available bit rate level assigned for transmission of media data of said first and second media content using said at least one transmission carrier and said bandwidth share information comprises rate share information.

10. The method according to claim 1, wherein one of said first and second media content is a video content and the other of said first and second media content is an associated audio content.

11. The method according claim 1, wherein said first media content is a scalable media content and each of said multiple potential versions of said first media content is associated with a defined bandwidth level.

12. The method according to claim 1, further comprising the step of:
re-providing, based on an updated available bandwidth level and said bandwidth share information, a version of said multiple potential versions of said first media content.

13. A method of generating a media content group comprising at least a first media content and a second media content to be collectively managed in a media session, said method comprising the steps of:
generating a first media content having multiple potential content versions, each of said multiple potential content versions of said first media content being adapted to a respective bandwidth level;
generating a second media content having multiple potential content versions, each of said multiple potential content versions of said second media content being adapted to a respective bandwidth level; and
generating a media container file comprising said first media content and said second media content;
determining bandwidth share information comprising a target percentage of an available bandwidth level that is to be allocated to said first media content for transmission using at least one transmission carrier, said bandwidth share information enabling:

i) estimation of a respective apportionment of said available bandwidth level to said first media content and second media content; and
ii) selection of a version of said multiple potential versions of said first media content and a version of said multiple potential versions of said second media content based on said available bandwidth level; and
assigning said bandwidth share information to said media content group;
wherein generating said media container file comprises generating said media container file comprising said first media content, said second media content and said bandwidth share information.

14. The method according to claim 13, wherein said determining step comprises determining at least two bandwidth share values as said bandwidth share information, each share value being associated with a defined bandwidth level set.

15. The method according to claim 13, further comprising the step of:
generating said container file comprising said first media content as at least one first media track and said second media content as at least one second media track and said bandwidth share information as a hint track associated with at least one media track of said at least one first or second media track.

16. The method according to claim 13, further comprising the step of: generating said container file comprising said first media content as at least one first media track and said second media content as at least one second media track and said bandwidth share information is included in at least one media track of said at least one first or second media track.

17. A media manager for collectively managing media data of a media content group comprising at least a first media content and a second media content, said media manager comprises:
A processor implemented at least partially in hardware, and
a media content provider arranged, when executed by the processor, for providing a media container file comprising:
i) said first media content available in the form of multiple potential versions, each of said multiple potential versions of said first media content being adapted for a respective bandwidth level; and
ii) said second media content available in the form of multiple potential versions, each of said multiple potential versions of said second media content being adapted for a respective bandwidth level, said media content provider is arranged, when executed by the processor, for:
i) providing a version of said multiple potential versions of said first media content, and
ii) providing a version of said multiple potential versions of said second media content; wherein said media container file comprises bandwidth share information: comprising a target percentage of an available bandwidth level assigned for transmission of media data of said first and second media content using at least one transmission carrier, said target percentage of said available bandwidth level is to be allocated to said first media content for transmission using said at least one transmission carrier, wherein said media manager further comprises:
a bandwidth estimator arranged, when executed by the processor, for estimating, based on said available bandwidth level and said bandwidth share information:
i) a bandwidth level available for said first media content and
ii) a bandwidth level available for said second media content, and wherein said media content provider is arranged, when executed by the processor, for:
i) providing, based on said determined bandwidth level available for said first media content, said version d said multiple potential versions of said first media content, and
ii) providing, based on said determined bandwidth level available for said second media content, said version of said multiple potential versions of said second media content.

18. The media manager according to claim 17, further comprising:
a transmitter connected to said media content provider and arranged for collectively transmitting, using said at least one transmission carrier, said versions provided by said media content provider.

19. The media manager according to claim 17, wherein said media content provider comprises a content version selector arranged, when executed by the processor, for selecting, based on said available bandwidth level and said bandwidth share information, a version of multiple pre-defined versions of said first media content, each of said multiple pre-defined versions of said first media content being adapted for a respective pre-defined bandwidth level.

20. The media manager according to claim 17, wherein said second media content is a scalable media content and said media content provider comprises a media data extractor arranged, when executed by the processor, for extracting, based on said available bandwidth level and said bandwidth share information, media data from said second media content to provide a version of said second media content adapted for a defined bandwidth level.

21. The media manager according to claim 17, wherein said bandwidth share information comprises at least two bandwidth share values, each value being associated with a defined bandwidth level set, and said media content provider comprises: a value selector arranged, when executed by the processor, for selecting a bandwidth share value based on a comparison between said available bandwidth level and said defined bandwidth level sets associated with said at least two bandwidth share values, and said media content provider is arranged for providing, based on said available bandwidth level and said identified bandwidth share value, i) a version of said multiple potential versions of said first media content, and ii) a version of said multiple potential versions of said second media content.

22. The media manager according to claim 17, wherein said first media content is associated with a maximum pre-defined bandwidth threshold, and said media manager further comprises: a bandwidth assigner arranged, when executed by the processor, for assigning, if said determined bandwidth level available for said first media content exceeds said maximum pre-defined bandwidth threshold, surplus available bandwidth to said second media content.

23. The media manager according to claim 17, wherein said first media content is associated with a minimum pre-defined bandwidth threshold, and said media manager further comprises: — a bandwidth assigner arranged, when executed by the processor, for assigning, if said determined bandwidth level available for said first media content is below said minimum pre-defined bandwidth threshold, all available bandwidth to said second media content.

24. The media manager according to claim 17, wherein said bandwidth share information comprises time-dependent bandwidth share information associated with said media content group and said media content provider is arranged for providing, based on said available bandwidth level and said time-dependent bandwidth share information, a version of said multiple potential versions of said first media content.

25. The media manager according to claim 17, wherein said media content provider is arranged for re-providing, based on an updated available bandwidth level, a version of said multiple potential versions of said first media content.

26. A network node comprising a media manager according to claim 17.

27. A user terminal comprising a media manager according to claim 17.

28. A media engine comprising:
   A processor implemented at least partially in hardware, and
   a media content generator arranged, when executed by the processor, for generating;
   i) a first media content having multiple potential versions and
   ii) a second media content having multiple potential versions,
   wherein each of said multiple potential versions of said first and second media content being adapted to a respective bandwidth level and said first and second media content belong to a media content group designed to be collectively managed in a media session; and
   a media container generator arranged, when executed by a processor, for generating a media container file comprising said first media content and said second media content;
   an information generator arranged, when executed by the processor, for generating bandwidth share information comprising a target percentage of an available bandwidth level that is to be allocated to said first media content for transmission using at least one transmission carrier,
   said bandwidth share information enabling:
   i) estimation of a respective apportionment of said available bandwidth level to said first media content and second media content and
   ii) selection of a version of said multiple potential versions of said first media content and a version of said multiple potential versions of said second media content based on said available bandwidth level; and
   an information assigner connected to said media content generator and said information generator and arranged, when executed by the processor, for assigning said bandwidth share information to said media content group;
   wherein said media container generator is arranged, when executed by the processor, for generating said media container file comprising said first media content, said second media content and said bandwidth share information.

* * * * *